United States Patent
Kikuchi

(10) Patent No.: US 6,829,109 B2
(45) Date of Patent: Dec. 7, 2004

(54) HOLDER-MOUNTED OPTICAL ELEMENT

(75) Inventor: Kimihiro Kikuchi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/796,528

(22) Filed: Mar. 9, 2004

(65) Prior Publication Data
US 2004/0184164 A1 Sep. 23, 2004

(30) Foreign Application Priority Data
Mar. 18, 2003 (JP) .......................... 2003-073215

(51) Int. Cl.[7] .................. G02B 7/02; C03B 11/08
(52) U.S. Cl. .............................. 359/819; 65/37
(58) Field of Search ................ 359/819; 65/37, 65/39, 47

(56) References Cited

U.S. PATENT DOCUMENTS

| | | | |
|---|---|---|---|
| 810,375 A | * | 1/1906 | Myers ....................... 65/308 |
| 3,244,497 A | * | 4/1966 | Copeland ..................... 65/162 |
| 4,591,373 A | * | 5/1986 | Sato ........................... 65/29.19 |
| 4,734,118 A | * | 3/1988 | Marechal et al. ............. 65/102 |
| 4,836,840 A | * | 6/1989 | Hirota et al. ................. 65/323 |
| 4,895,585 A | | 1/1990 | Angenent et al. |
| 5,015,280 A | * | 5/1991 | Kimoto et al. ................ 65/307 |
| 5,032,160 A | * | 7/1991 | Murata et al. ................ 65/102 |
| 5,188,650 A | * | 2/1993 | Nomura ......................... 65/64 |
| 5,630,859 A | * | 5/1997 | Takagi et al. ................. 65/102 |
| 5,805,361 A | * | 9/1998 | Morimoto et al. .......... 359/819 |

FOREIGN PATENT DOCUMENTS

JP 2729702 12/1997

* cited by examiner

Primary Examiner—Ricky Mack
(74) Attorney, Agent, or Firm—Brinks Hofer Gilson & Lione

(57) ABSTRACT

Provided is a high-precision holder-mounted optical element that makes it possible to correct a volume error of an optical element material. In a holder-mounted optical element 1 where an optical element 20 is accommodated into a cylindrical holder 10, the holder 10 has a thin deformation portion 12 that is deformed by the pressure applied from the inner circumferential side thereof and a surplus portion 21a, which press-contacts with the deformation portion 12, is formed in the optical element 20.

4 Claims, 3 Drawing Sheets

HOLDER-MOUNTED OPTICAL ELEMENT

This application claims the benefit of priority to Japanese Patent Application No. 2003-073215, herein incorporated by reference.

BACKGROUND OF THE INVENTION

1. Field of the Invention

The present invention relates to a holder-mounted optical element in which a holder and an optical element are formed as a single piece, and more particularly, to a holder-mounted optical element formed by press-forming an optical element material within the holder.

2. Description of the Related Art

Optical elements, such as a lens mounted in the pickup head of a CD player and a lens used in a digital camera, require high precision when they are mounted. For example, as disclosed in patent document 1, in order to satisfy this requirement, a holder-mounted optical element in which a holder holds an optical element is generally manufactured, and its mounting position is adjusted by the holder, thereby improving mounting accuracy. The holder-mounted optical element is formed in such a manner that an optical element material, which is arranged inside a cylindrical holder, is softened by heating, the softened optical element material is press-formed by a metal mold to form an optical element, and at the same time, the optical element is compressed to the holder. In this way, the optical element and the holder are formed as a single piece.

[Patent Document 1]

Japanese Unexamined Patent Application Publication No. 3-265529 (FIG. 1)

However, in a case where an optical element material is press-formed, if there is any error in the volumetric metering of the optical element material, the thickness of the optical element material is changed. As a result, optical performance deteriorates, and an ideal optical location should be obtained for adjustment and fixation, causing problems in terms of performance and location determination.

To solve such problems, the volumetric metering of the optical element material should be precisely preformed to reduce the volume error. However, in order to make sure to obtain the desired effects, it is necessary to handle not only the volume of the optical element material but also the holder shape with high precision. However, in this case, material and processing costs increase.

SUMMARY OF THE INVENTION

The present invention is designed to solve such problems, and it is an object of the present invention to provide a high-precision holder mounted optical element that makes it possible to correct for errors in the volumetric metering of the optical element material.

To achieve this object, a holder-mounted optical element is provided, in which an optical element is accommodated into a cylindrical holder, wherein the holder has a thin deformation portion that is deformed by pressure applied from an inner circumferential side thereof, and a surplus portion, which press-contacts with the deformation portion, is formed in the optical element.

Also, according to the present invention, the surplus portion of the optical element is composed of a surplus of an optical element material, and the deformation portion is deformed by the pressure applied from the surplus portion.

Furthermore, according to the present invention, the thin deformation portion is formed in a part of the side surface of the holder, and the surplus portion is formed to outwardly protrude from a circumferential portion of the optical element.

Moreover, according to the present invention, the holder has a thin collar portion on the inner circumferential side, the collar portion serving as the deformation portion, and the surplus portion is formed around a tip portion of the inside of the collar portion.

DESCRIPTION OF THE PREFERRED EMBODIMENT

Figure 1:
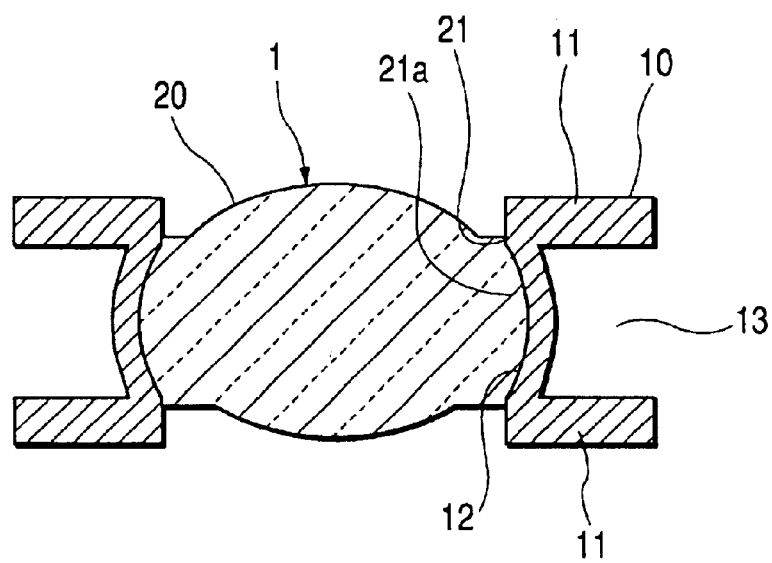
FIG. 1 is a cross-sectional view of a holder-mounted optical element according to a first embodiment of the present invention.
Figure 2:
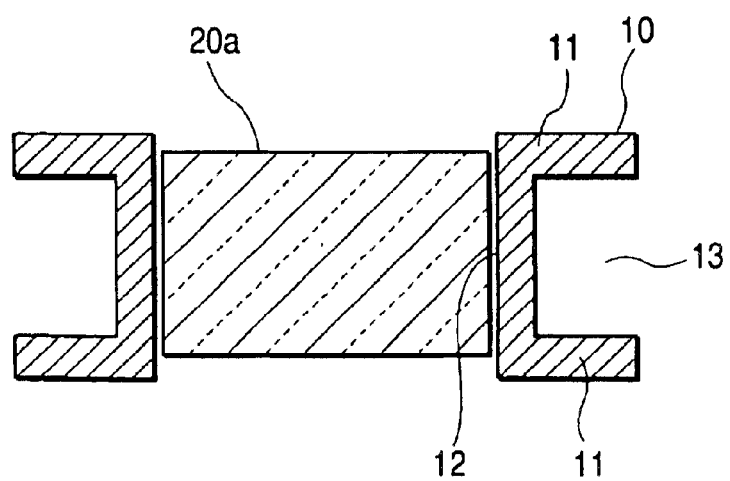
FIG. 2 is a cross-sectional view of a lens holder and a lens material according to the first embodiment of the present invention before press forming is performed.

Preferred embodiments of the present invention will now be described with reference to the drawings. First, a first embodiment of the present invention will be described. FIG. 1 is a cross-sectional view of a holder-mounted optical element according to the first embodiment of the present invention. FIG. 2 is a cross-sectional view of a lens holder and a lens material according to the first embodiment of the present invention before press forming is performed. FIG. 3 is a cross-sectional view illustrating a manufacturing state of the holder-mounted optical element according to the first embodiment of the present invention.

A holder-mounted optical element 1 according to the present invention is used for, for example, pickup heads of CD players or digital cameras and includes a cylindrical lens holder 10 and a spherical lens 20 accommodated into the lens holder 10, as shown in FIG. 1.

The lens holder 10 for holding the lens 20 and determining the location thereof in an optical device is made of aluminum or stainless steel through a cutting process or casting process. The lens holder 10 includes attaching portions 11, which serve as reference surfaces when they are attached to an optical device, and a thin deformation portion 12 continuously formed with the attaching portions 11 on the inner circumferential side thereof. An outer circumferential gap portion 13 surrounded by the attaching portions 11 and the deformation portions 12 is provided on the outer circumferential side of the deformation portion 12. Here, the deformation portion 12 is deformed such that its central portion is outwardly curved in the diameter direction, that is, towards the outer circumferential gap portion 13.

A glass lens 20 is accommodated into the lens holder 10. Both surfaces of the glass lens 20 are spherically convex and are formed by press-forming a lens material 20a shown in FIG. 2. Also, the glass lens 20 is pressed to the lens holder 10 by the pressure applied at the time of press forming and is thus integrated with the lens holder 10. A circumferential portion 21 of the glass lens 20 has a surplus portion 21a that protrudes from the entire surface of the glass lens 20 to the outside.

The lens material 20a is composed of an optical glass material. For example, the optical glass material may be a lead oxide-based glass material SFS01. Here, the lens material 20a intentionally has a surplus in addition to a volume required for forming the glass lens 20. In this manner, a volume error of the conventional lens material 20a is included in the surplus. Thus, at least the proper volume of the lens material 20a required for forming the glass lens 20 can be secured.

Here, in an initial state of the lens holder 10 that is formed by a cutting process, etc., the deformation portion 12 is formed nearly vertically with respect to the attaching portions 11. However, by the pressure applied when the glass lens 20 is press-formed, the surplus of the lens material 20a presses the deformation portion 12, and then the deformation portion 12 is outwardly curved in the diameter direction thereof. Then, the surplus of the lens material 20a entirely goes into a space formed inside the deformation portion 12 due to the deformation of the deformation portion 12. In other words, the surplus of the lens material 20a, which corresponds to the volume of a material that is unnecessary to the formation of the glass lens 20, and the volume error are absorbed by the deformation of the deformation portion 12. As a result, it is possible to form a high-precision lens 20 having the desired shape.

However, if the deformation portion 12 has high rigidity, the deformation portion 12 is easily not deformed by the pressure applied from the surplus of the lens material 20a, and thus the surplus becomes an error in forming the lens 20. On the contrary, if the deformation portion 12 has low rigidity, it is easily deformed by the pressure applied from the surplus of the lens material 10a and is then excessively deformed more than the amount of deformation required for absorbing the surplus. In addition, if the rigidity is low, the shape of the lens holder 10 cannot be maintained. In other words, the deformation portion 12 preferably has rigidity that allows it to properly deform, not to excessively deform, due to the pressure applied from the surplus of the lens material 20. By selecting a thickness and a material that satisfy the above conditions for the rigidity of the deformation portion 12, the deformation portion 12 can function more effectively.

Next, a method of manufacturing the holder-mounted optical element 1 will be described. FIG. 3 shows a manufacturing apparatus for manufacturing the holder-mounted optical element 1. A manufacturing apparatus 60 includes an upper die A comprising an upper inner die 61 and an upper outer die 62, and a lower die B comprising a lower inner die 63 and a lower outer die 64. The lower inner die 63 and the lower outer die 64 are provided on the lower side of the upper inner die 61 and the upper outer die 62. Also, an outer diameter die C is provided to surround the upper die A and the lower die B.

The upper inner die 61 and the lower inner die 63 are formed in a substantially cylindrical shape. Transfer surfaces 61a and 63a for forming a spherical lens are formed at the lower end of the upper inner die 61 and the upper end of the lower inner die 63, respectively.

In the meantime, the upper outer die 62 and the lower outer die 64 are situated on the outer circumferential sides of the upper inner die 61 and the lower inner die 63, respectively, and are formed in a cylindrical shape. The thickness of the upper outer die 62 and the lower outer die 64 are approximately equal to that of the lens holder 10 described above, and the inner diameter of the outer diameter die C is approximately equal to the outer diameter of the lens holder 10. Furthermore, the upper inner die 61 and the upper outer die 62 may slide independently.

Figure 3A:
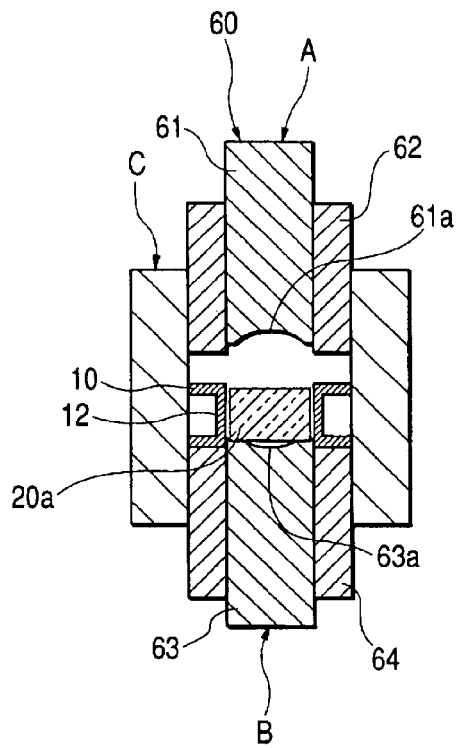
FIGS. 3A and 3B are a cross-sectional views illustrating a manufacturing state of the holder-mounted optical element according to the first embodiment of the present invention.

When the holder-mounted optical element 1 is manufactured, first, the lens holder 10, which has been previously subjected to a cutting process to have predetermined dimensions, is mounted on the lower outer die 64, and the lens material 20a is mounted inside the lens holder 10 (FIG. 3A).

Here, although not shown in FIG. 3, a heating member, which is provided on the outer circumferential side of the lens holder 10, heats the lens holder 10. In addition, the lens material 20a is heated above its softening temperature. Furthermore, the lens material 20a in a preheated state may be mounted inside the lens holder 10.

Figure 3B:
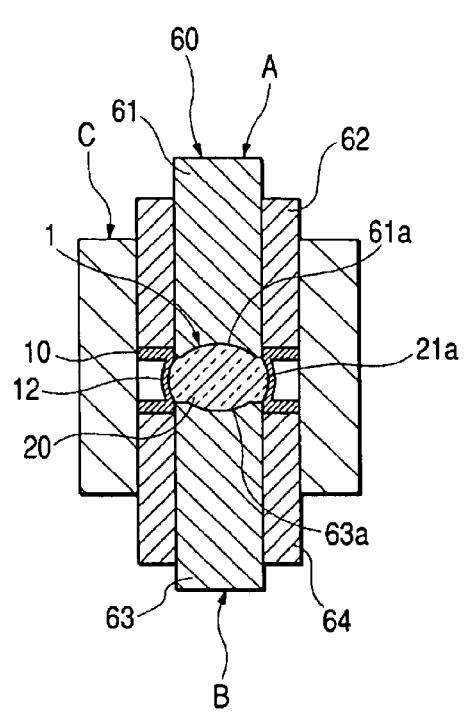

Once the lens material 20a is softened by heating, press forming is performed on the lens material 20a (FIG. 3B). More specifically, the upper outer die 62 is first moved downwardly with respect to the lens holder 10 mounted on the lower outer die 64, and the lens holder 10 is compressed and fixed between the upper outer die 62 and the lower outer die 64. At the same time, the upper inner die 61 is moved downwardly with respect to the softened lens material 20a mounted on the lower inner die 63, and the lens material 20a is pressed by the transfer surface 61a of the upper inner die 61 and the transfer surface 63a of the lower inner die 63. Thus, the lens 20 of which both surfaces are spherically convex is formed. The press forming is performed under the conditions where the viscosity of the lens material 20a is above a glass transition point and below a glass softening point.

Further, once the lens material 20a is pressed, the surplus of the lens material 20a expands due to the applied pressure and presses the deformation portion 12 of the lens holder 10 to outwardly deform in the diameter direction thereof. Then, the surplus of the lens material 20a goes into the inside of the deformation portion 12, thereby forming the aforementioned surplus portion 21a.

Figure 4:
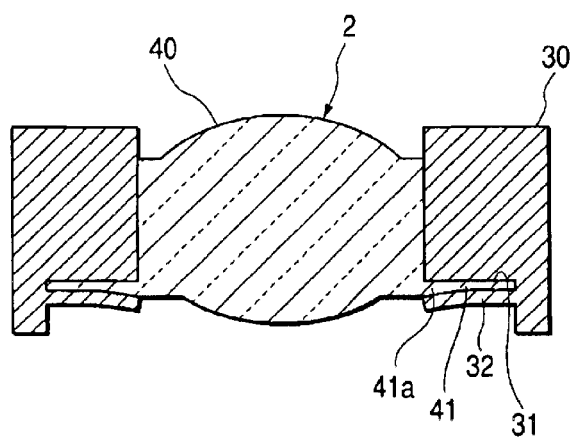
FIG. 4 is a cross-sectional view of a holder-mounted optical element according to a second embodiment of the present invention.
Figure 5:
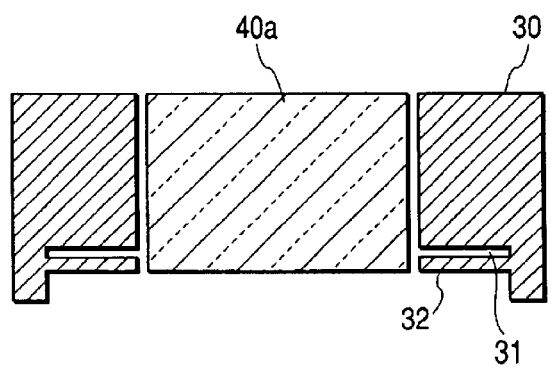
FIG. 5 is a cross-sectional view of a lens holder and a lens material according to the second embodiment of the present invention before press forming is performed.

The above is the first embodiment according to the present invention. Hereinafter, a second embodiment of the present invention will be described. FIG. 4 is a cross-sectional view of a holder-mounted optical element according to the second embodiment of the present invention. FIG. 5 is a cross-sectional view of a lens holder and a lens material according to the second embodiment of the present invention before press forming is performed. FIG. 6 is a cross-sectional view of a manufacturing state of the holder-mounted optical element according to the second embodiment of the present invention.

A holder-mounted optical element 2 according to the second embodiment is used for, for example, pickup heads of CD players or digital cameras, as in the first embodiment. As shown in FIG. 4, the holder-mounted optical element 2 comprised a cylindrical lens holder 30 and a spherical lens 40 that is accommodated into the lens holder 30.

The lens holder 30 is made of aluminum or stainless steel through a cutting process or casting process. On the inner circumferential side of the lens holder 30, a thin collar portion 32 is formed at a location that is approximately similar to one surface of the lens 40, with a filling groove 31 sandwiched therebetween. A tip portion of the collar portion 32 is curved in the outside direction.

A glass lens 40 is accommodated into the lens holder 30. The lens 40, of which both surfaces are spherically convex, is formed by press-forming the lens material 40a as shown in FIG. 5. In addition, the glass lens 40 is compressed to the lens holder 30 by pressure in press forming and is then integrated with the lens holder 30. A filling convex portion 41, which is filled into the above-mentioned filling groove 31, is provided with a part of the outer circumferential portion of the lens 40. Moreover, a surplus portion 41a is formed around the tip portion of the collar portion 32 of the filling groove 31.

The lens material 40a intentionally has a surplus in addition to the volume required for forming the lens 40, as in the first embodiment of the present invention. Also, in this embodiment, the volume required for forming the lens 40 includes the volume of the filling convex portion 41.

Here, in an initial state of the lens holder 30 that is formed through a cutting process, the collar portion 32 is formed in a flat shape as shown in FIG. 5. However, the lens material 40a goes into the filling groove 31 due to the pressure applied when the lens 40 is press-formed, and the surplus of the lens material 40a inside the filling groove 31 presses the collar portion 32 from the inside thereof to the outside. Thus, the tip portion of the collar portion 32 is outwardly bent, and the filling groove 31 expands. The surplus of the lens material 40a entirely goes into the expanded portion of the filling groove 31. Thus, the surplus of the lens material 40a, which is the volume not required for forming the lens 40, and a volume error are absorbed by the deformation of the collar portion 32. As a result, it is possible to form a high-precision lens 40 having the desired shape. Furthermore, the requirement for rigidity of the collar portion 32 is the same as in the first embodiment of the present invention.

Figure 6A:
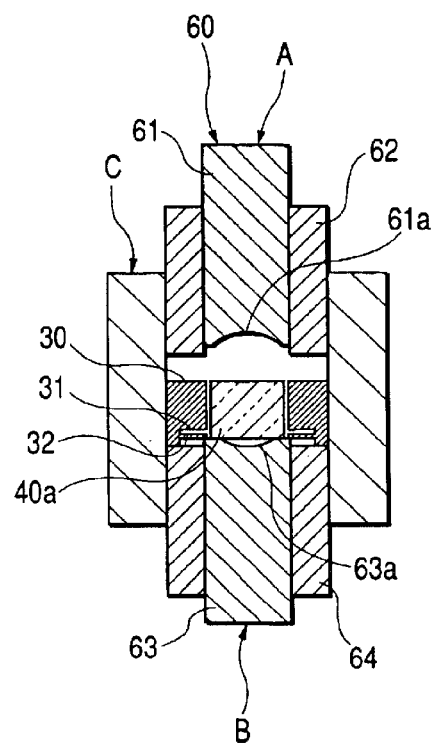
FIGS. 6A and 6B are cross-sectional views of a manufacturing state of the holder-mounted optical element according to the second embodiment of the present invention.
Figure 6B:
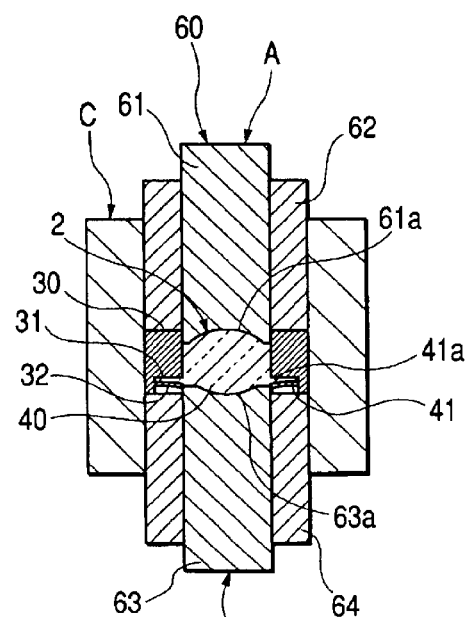

Hereinafter, a method of manufacturing the holder-mounted optical element 2 will be described. A manufacturing apparatus 60 for manufacturing the holder-mounted optical element 2 shown in FIG. 6 is identical to that of the first embodiment and will not be described. In the manufacturing method of the holder-mounted optical element 2, first, the lens holder 30, which has been previously subjected to a cutting process or casting process to have predetermined dimensions, is mounted on the lower outer die 64, and the lens material 40a is accommodated into the lens holder 30 (FIG. 6A). At this time, the lens holder 30 is mounted such that a surface provided with the collar portion 32 faces the lower outer die 64. Then, the lens holder 30 and the lens material 40a are heated. When the lens material 40a is softened by heating, press forming is performed on the lens material 40a (FIG. 6B).

Furthermore, when the lens material 40a is pressed, the lens material 40a goes into the filling groove 31 due to the applied pressure. Then, the surplus of the lens material 40a expands and presses the collar portion 32 from the inside of the filling groove 31 towards the outside to deform the collar portion 32. The surplus of the lens material 40a goes into the expanded portion of the filling groove 31 formed by the deformation, thereby forming the surplus portion 41a.

The above is the description of the first and second embodiment according to the present invention. In the above descriptions, a method of manufacturing a spherical convex lens is explained. However, the present invention is not limited thereto, but may be applied to lenses in other shapes, such as a concave lens, etc. Also, the present invention is not limited to the lenses, but may be applied to other optical elements, such as a diffraction lattice integrated with a holder, etc.

According to the present invention, a holder includes a thin deformation portion deformed by the pressure applied from the inner circumference thereof, and an optical element is provided with a surplus portion that press-contacts with the deformation portion. In this way, a volume error of an optical element material during the formation of the optical element is absorbed by the deformation of the deformation portion. Therefore, it is possible to precisely form an optical element and to form a holder-mounted optical element having a high-precision optical element, without improving the precision of the holder.

What is claimed is:

1. A holder-mounted optical element comprising a cylindrical holder and an optical part accommodated in the holder,
    wherein the holder has a thin deformation portion that is deformed by pressure applied from an inner circumferential side thereof, and a surplus portion, which press-contacts with the deformation portion, is formed in the optical part.

2. A holder-mounted optical element according to claim 1, wherein the surplus portion of the optical part is composed of a surplus of an optical element material, and the deformation portion is deformed by pressure applied from the surplus portion.

3. A holder-mounted optical element according to claim 2, wherein the thin deformation portion is formed in a part of a side surface of the holder, and the surplus portion is formed to outwardly protrude from a circumferential portion of the optical part.

4. A holder-mounted optical element according to claim 2, wherein a thin collar portion is formed on the inner circumferential side of the holder, the collar portion serving as the deformation portion, and the surplus portion is formed around a tip portion of an inside of the collar portion.

* * * * *